United States Patent [19]
Louisnathan

[11] Patent Number: 5,812,260
[45] Date of Patent: Sep. 22, 1998

[54] METHOD AND SYSTEM FOR MEASURING OPTICAL DISTORTION

[75] Inventor: S. John Louisnathan, Big Flats, N.Y.

[73] Assignee: Corning Incorporated, Corning, N.Y.

[21] Appl. No.: 732,568

[22] Filed: Oct. 15, 1996

Related U.S. Application Data

[60] Provisional application No. 60/005,478 Oct. 16, 1995.
[51] Int. Cl.$^6$ .................................................. G01N 21/00
[52] U.S. Cl. ........................................................ 356/239
[58] Field of Search ................................... 356/237, 239, 356/240, 430, 431, 243, 251–254, 128, 124, 124.5; 250/562, 563, 571, 572; 358/106, 107, 103, 250; 362/217, 225, 250, 285; 359/13, 15, 601, 630, 632; 340/705, 980; 434/42–44

[56] References Cited

U.S. PATENT DOCUMENTS

| | | | |
|---|---|---|---|
| 4,299,482 | 11/1981 | Task | 356/124 |
| 4,310,242 | 1/1982 | Genco et al. | 356/128 |
| 4,647,197 | 3/1987 | Kitaya et al. | 356/239 |
| 4,776,692 | 10/1988 | Kalawsky | 356/239 |
| 5,343,288 | 8/1994 | Cohen et al. | 356/239 |
| 5,446,536 | 8/1995 | Miyake et al. | 356/239 |
| 5,471,297 | 11/1995 | Tani | 356/239 |
| 5,568,258 | 10/1996 | Uemura et al. | 356/371 |

Primary Examiner—Frank G. Font
Assistant Examiner—Michael P. Stafira
Attorney, Agent, or Firm—Christopher Gallo; Gunnar Leinberg; Angela N. Nwaneri

[57] ABSTRACT

A system and method for measuring a level of optical distortion in a transparent material in accordance with the present invention includes an image capturing device, a section with a pattern of substantially uniform features, and a processing system which operates on software programmed in a memory in the processing system. The method for measuring the level of optical distortion stored in the memory comprises the steps of: inputting image signals of an image of a pattern of substantially uniform features as captured through the transparent material to a processing system; generating one or more parameter signals from the measurements of one or more parameters in each of the features in the image using the image signals; generating image area signals for each of the features in the image in response to the parameter signals, the image area signals representative of the area in each of the features in the image; generating a result signal in response to the image area signals for each of the features in the image.

19 Claims, 21 Drawing Sheets

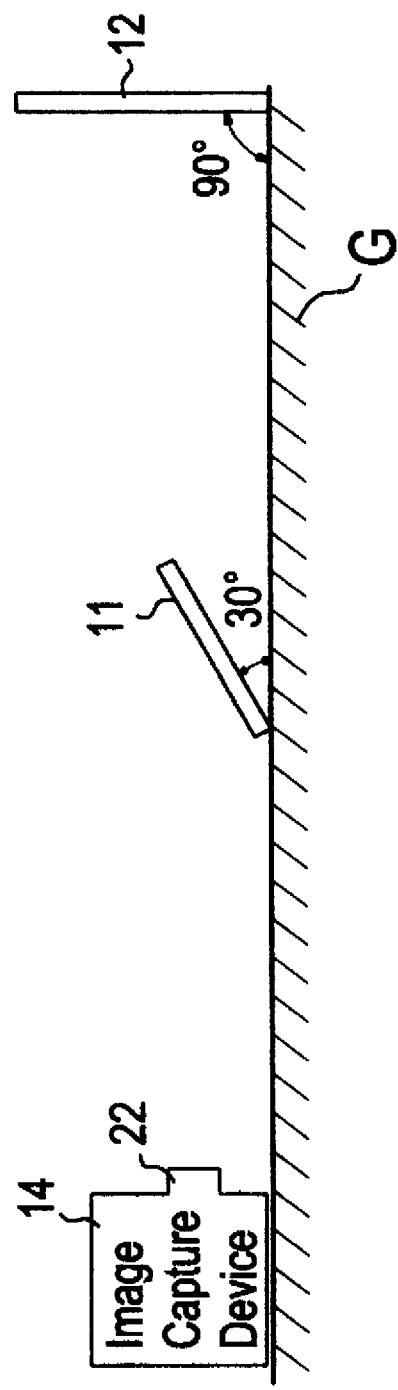

FIG. 6

| a0 | a1 | a2 | a3 | a4 | a5 | ID |
|---|---|---|---|---|---|---|
| -41.4337 | 3.347198 | -1.90452 | 0.019652 | 1.727067 | 0.541659 | NS02CJ |
| -54.5402 | 3.313457 | -1.08774 | 0.001099 | 1.575514 | 0.427262 | NS02CN |
| -41.075 | 2.762374 | -1.27064 | -0.006 | 1.90198 | 0.5508 | NS03CJ |
| -47.5122 | 3.018795 | -1.11739 | 0.001899 | 1.858416 | 0.461481 | NS03CN |
| -30.7561 | 2.365298 | -1.43018 | 0.023639 | 1.797285 | 0.638367 | NS04CJ |
| -40.6421 | 3.239331 | -1.81146 | 0.004552 | 1.94545 | 0.541389 | NS04CN |
| -78.2847 | 4.026961 | -0.93412 | 0.073261 | 2.091805 | 0.225043 | NS05CJ |
| -24.129 | 2.213113 | -1.4539 | -0.00218 | 1.889005 | 0.660285 | NS05CN |
| -14.6733 | 1.939668 | -1.68496 | 0.001662 | 1.934678 | 0.745486 | NS06CJ |
| -20.1624 | 2.133175 | -1.56757 | 0.002658 | 1.973295 | 0.682034 | NS06CN |
| -28.1139 | 0.962494 | 0.361181 | 0.015488 | 1.397955 | 0.57446 | NS07CJ |
| -58.3337 | 0.909933 | 2.125607 | 0.050745 | 1.674712 | 0.230717 | NS07CN |
| -50.3523 | 2.77376 | -0.73137 | 0.018087 | 1.833245 | 0.436888 | NS08CJ |
| -10.7459 | 0.349694 | 0.085543 | -0.00094 | 2.101496 | 0.699689 | NS08CN |
| -66.3246 | 3.442669 | -0.78987 | 0.030729 | 1.76 | 0.346317 | NS09CJ |
| -14.7014 | 2.066405 | -1.84747 | 0.006997 | 1.919081 | 0.749654 | NS09CN |
| -73.4254 | 3.77763 | -0.78488 | 0.021389 | 1.791935 | 0.291474 | NS10CJ |
| -49.4622 | 2.973905 | -1.02252 | -0.00069 | 1.811141 | 0.470197 | NS10CN |
| -44.6183 | 3.167394 | -1.53833 | 0.006219 | 1.756688 | 0.525113 | NS11CJ |
| -35.0249 | 2.809371 | -1.64943 | 0.015255 | 1.925634 | 0.588092 | NS11CN |
| -69.3373 | 3.739755 | -0.89929 | -0.00536 | 1.773071 | 0.332207 | NS12CJ |
| -48.8761 | 3.172892 | -1.26224 | 0.00519 | 1.79301 | 0.468831 | NS12CN |
|  |  |  |  |  |  |  |
| -134.009 | 5.078463 | 0.590446 | 0.078076 | 1.657866 | -0.14359 | SGUND |

| Bin | NS02CJ | NS02CN | NS03CJ | NS03CN | NS04CJ | NS04CN | NS05CJ | NS05CN | NS06CJ | NS06CN | NS07CJ | NS07CN |
|---|---|---|---|---|---|---|---|---|---|---|---|---|
| 30 | 0 | 0 | 0 | 0 | 0 | 0 | 0 | 0 | 0 | 0 | 0 | 0 |
| 35 | 0 | 0 | 0 | 0 | 0 | 0 | 0 | 0 | 0 | 0 | 0 | 4 |
| 40 | 1 | 0 | 0 | 0 | 0 | 0 | 0 | 0 | 0 | 1 | 0 | 0 |
| 45 | 1 | 0 | 0 | 1 | 1 | 1 | 0 | 0 | 0 | 0 | 0 | 1 |
| 50 | 3 | 0 | 0 | 0 | 1 | 0 | 0 | 0 | 3 | 2 | 0 | 3 |
| 55 | 2 | 3 | 0 | 4 | 2 | 0 | 1 | 0 | 0 | 0 | 0 | 0 |
| 60 | 2 | 0 | 2 | 0 | 2 | 3 | 0 | 2 | 5 | 9 | 0 | 7 |
| 65 | 6 | 5 | 3 | 0 | 1 | 7 | 0 | 4 | 3 | 6 | 0 | 5 |
| 70 | 9 | 2 | 3 | 5 | 6 | 7 | 2 | 6 | 7 | 8 | 8 | 7 |
| 75 | 2 | 9 | 8 | 8 | 7 | 14 | 3 | 10 | 14 | 17 | 4 | 11 |
| 80 | 12 | 6 | 9 | 14 | 12 | 12 | 7 | 12 | 16 | 14 | 17 | 16 |
| 85 | 7 | 14 | 18 | 16 | 19 | 14 | 8 | 12 | 24 | 12 | 9 | 16 |
| 90 | 43 | 35 | 25 | 41 | 31 | 31 | 9 | 26 | 37 | 18 | 32 | 23 |
| 95 | 29 | 24 | 29 | 42 | 26 | 33 | 30 | 27 | 26 | 43 | 38 | 34 |
| 100 | 32 | 29 | 49 | 35 | 41 | 30 | 33 | 29 | 36 | 37 | 54 | 20 |
| 105 | 58 | 64 | 63 | 53 | 61 | 53 | 40 | 40 | 69 | 58 | 64 | 30 |
| 110 | 77 | 55 | 96 | 63 | 84 | 79 | 77 | 54 | 66 | 86 | 88 | 81 |
| 115 | 87 | 82 | 67 | 77 | 79 | 62 | 80 | 62 | 69 | 65 | 80 | 85 |
| 120 | 112 | 91 | 83 | 70 | 79 | 79 | 80 | 71 | 91 | 69 | 98 | 65 |
| 125 | 85 | 78 | 64 | 53 | 66 | 78 | 115 | 72 | 58 | 48 | 49 | 73 |
| 130 | 72 | 65 | 64 | 54 | 83 | 68 | 76 | 62 | 69 | 66 | 78 | 72 |
| 135 | 30 | 47 | 29 | 47 | 32 | 32 | 64 | 71 | 32 | 32 | 37 | 32 |
| 140 | 23 | 20 | 25 | 21 | 21 | 21 | 30 | 27 | 25 | 22 | 17 | 23 |
| 145 | 17 | 9 | 16 | 16 | 22 | 14 | 24 | 21 | 20 | 11 | 18 | 11 |
| 150 | 3 | 3 | 8 | 9 | 7 | 5 | 12 | 21 | 9 | 7 | 4 | 6 |
| 155 | 1 | 0 | 15 | 3 | 7 | 2 | 4 | 7 | 8 | 10 | 1 | 3 |
| 160 | 0 | 0 | 5 | 3 | 4 | 0 | 3 | 0 | 4 | 2 | 5 | 0 |
| 165 | 0 | 0 | 0 | 0 | 1 | 0 | 0 | 1 | 2 | 1 | 1 | 0 |
| 170 | 0 | 0 | 1 | 0 | 0 | 0 | 0 | 1 | 1 | 0 | 0 | 0 |
| 175 | 0 | 0 | 0 | 0 | 0 | 0 | 0 | 0 | 0 | 1 | 0 | 0 |
| 180 | 0 | 0 | 0 | 0 | 0 | 0 | 0 | 0 | 1 | 1 | 0 | 0 |
| 185 | 0 | 0 | 0 | 0 | 0 | 0 | 0 | 0 | 0 | 0 | 0 | 0 |
| 190 | 0 | 0 | 0 | 0 | 0 | 0 | 1 | 0 | 0 | 0 | 1 | 0 |
| 195 | 0 | 0 | 0 | 0 | 0 | 0 | 0 | 0 | 0 | 0 | 0 | 0 |
| 200 | 0 | 0 | 0 | 0 | 0 | 0 | 0 | 0 | 0 | 0 | 0 | 0 |
| More | 0 | 0 | 0 | 0 | 0 | 0 | 0 | 0 | 0 | 0 | 0 | 1 |

| Bin | NS08CJ | NS08CN | NS09CJ | NS09CN | NS10CJ | NS10CN | NS11CJ | NS11CN | NS12CJ | NS12CN | SGUND |
|---|---|---|---|---|---|---|---|---|---|---|---|
| 30 | 0 | 2 | 0 | 0 | 0 | 0 | | | 0 | 0 | 0 |
| 35 | 1 | 0 | 0 | 0 | 0 | 0 | | | 0 | 0 | 0 |
| 40 | 1 | 2 | 0 | 0 | 0 | 0 | | | 0 | 0 | 0 |
| 45 | 0 | 3 | 0 | 0 | 0 | 0 | 1 | 0 | 0 | 0 | 0 |
| 50 | 5 | 6 | 0 | 0 | 0 | 1 | 0 | 0 | 0 | 0 | 0 |
| 55 | 3 | 11 | 0 | 2 | 0 | 1 | 0 | 1 | 0 | 1 | 0 |
| 60 | 7 | 4 | 3 | 3 | 0 | 1 | 2 | 3 | 1 | 3 | 0 |
| 65 | 7 | 14 | 1 | 5 | 5 | 1 | 3 | 4 | 2 | 3 | 3 |
| 70 | 7 | 9 | 6 | 6 | 1 | 5 | 6 | 8 | 3 | 5 | 89 |
| 75 | 8 | 19 | 6 | 10 | 10 | 6 | 11 | 13 | 14 | 8 | 560 |
| 80 | 15 | 23 | 12 | 7 | 3 | 11 | 13 | 12 | 15 | 18 | 48 |
| 85 | 14 | 25 | 29 | 13 | 22 | 11 | 31 | 15 | 29 | 18 | 260 |
| 90 | 22 | 34 | 25 | 22 | 32 | 6 | 24 | 38 | 21 | 25 | 224 |
| 95 | 26 | 27 | 25 | 32 | 32 | 38 | | 27 | | 30 | 35 |
| 100 | 34 | 40 | 47 | 39 | 36 | 29 | 49 | 37 | 39 | 41 | 3 |
| 105 | 71 | 33 | 69 | 63 | 70 | 54 | 59 | 41 | 55 | 45 | |
| 110 | 86 | 73 | 77 | 60 | 68 | 54 | 63 | 68 | 72 | 74 | |
| 115 | 82 | 62 | 94 | 52 | 98 | 70 | 72 | 50 | 74 | 57 | |
| 120 | 95 | 68 | 93 | 95 | 110 | 67 | 86 | 83 | 113 | 77 | |
| 125 | 67 | 53 | 95 | 53 | 96 | 73 | 92 | 61 | 80 | 86 | |
| 130 | 59 | 50 | 61 | 63 | 64 | 52 | 74 | 63 | 78 | 69 | |
| 135 | 29 | 33 | 26 | 28 | 34 | 69 | 35 | 51 | 47 | 34 | 6 |
| 140 | 21 | 22 | 28 | 26 | 24 | 41 | 31 | 33 | 20 | 22 | 0 |
| 145 | 12 | 23 | 10 | 15 | 13 | 19 | 24 | 15 | 16 | 17 | 1 |
| 150 | 9 | 8 | 6 | 9 | 2 | 17 | 5 | 4 | 5 | 4 | 0 |
| 155 | 3 | 2 | 1 | 3 | 4 | 6 | 4 | 5 | 6 | 5 | 0 |
| 160 | 1 | 3 | 1 | 2 | 1 | 4 | 4 | 4 | 1 | 3 | 0 |
| 165 | 3 | 4 | 0 | 0 | 2 | 2 | 2 | 5 | 2 | 0 | 0 |
| 170 | 0 | 0 | 0 | 0 | 1 | 0 | 0 | 1 | 0 | 1 | 0 |
| 175 | 3 | 0 | 0 | 0 | 0 | 1 | 0 | 2 | 0 | 0 | 0 |
| 180 | 1 | 0 | 0 | 0 | 0 | 0 | 0 | 0 | 0 | 0 | 0 |
| 185 | 0 | 0 | 0 | 0 | 0 | 0 | 0 | 0 | 0 | 0 | 0 |
| 190 | 0 | 0 | 0 | 0 | 0 | 1 | 0 | 0 | 0 | 0 | 0 |
| 195 | 0 | 0 | 0 | 0 | 0 | 0 | 0 | 0 | 0 | 0 | 0 |
| 200 | 0 | 0 | 0 | 0 | 0 | 0 | 0 | 0 | 0 | 0 | 0 |
| More | 1 | 1 | 0 | 0 | 0 | 0 | 0 | 0 | 0 | 0 | 0 |

| TT Range | R(ODQ) |
|---|---|
| <150 | 1 |
| 151- 170 | 2 |
| 171- 190 | 3 |
| 191-210 | 4 |
| 211- 230 | 5 |
| 231- 250 | 6 |
| 251- 270 | 7 |
| 271- 290 | 8 |
| 291- 310 | 9 |
| > 311 | 10 |

"Accept" if R(ODQ) <= 4
"Reject" if R(ODQ) > 4

FIG. 9B

| 7 | sgund | |
|---|---|---|
| 153 | 10cj | "Accept" |
| 154 | 09cj | "Accept" |
| 165 | 05cj | "Accept" |
| 177 | 02cn | "Accept" |
| 177 | 08cj | "Accept" |
| 182 | 12cj | "Accept" |
| 187 | 07cn | "Accept" |
| 191 | 02cj | "Accept |
| 191 | 07cj | "Accept |
| 192 | 04cn | "Accept" |
| 192 | 12cn | Maybe ? |
| 193 | 03cj | Maybe ? |
| 195 | 10cn | Maybe ? |
| 195 | 11cj | Maybe ? |
| 196 | 04cj | Maybe ? |
| 198 | 09cn | Maybe ? |
| 203 | 06cn | "Reject" |
| 206 | 05cn | "Reject" |
| 227 | 06cj | "Reject" |
| 234 | 11cn | "Reject" |
| 246 | 08cn | "Reject" |
| 255 | 03cn | "Reject" |

FIG. 9C

| 7 | sgund | |
|---|---|---|
| 354 | 10cj+n | "Accept" |
| 366 | 09cj+n | "Accept" |
| 368 | 02cj+n | "Accept" |
| 380 | 05cj+n | "Accept" |
| 380 | 12cj+n | "Accept" |
| 395 | 07cj+n | Maybe ? |
| 398 | 04cj+n | "Reject" |
| 426 | 03cj+n | "Reject" |
| 441 | 11cj+n | "Reject" |
| 454 | 06cj+n | "Reject" |
| 474 | 08cj+n | "Reject" |

METHOD AND SYSTEM FOR MEASURING OPTICAL DISTORTION

FIELD OF THE INVENTION

This invention relates to a method and system for measuring optical distortion in a transparent material. This application is a continuation of U.S. provisional application Ser. No. 60/005,478 filed on Oct. 16, 1995, which is herein incorporated by reference.

BACKGROUND OF THE INVENTION

When an object or a scene is visually observed through a transparent material, part or all of the object or scene may appear distorted because of inhomogeneities in the material. Examples of transparent materials which may optically distort objects or scenes include window panes, windshields, television and computer screens, and petri dishes. When transparent materials exhibit optical distortion, the human psychological reaction to the visual perception is annoying and can lead to hazardous accidents. Accordingly, manufacturers of transparent materials aim to control their fabrication so that the materials exhibit little or no optical distortion.

One prior method for measuring optical distortion is disclosed in U.S. Pat. No. 5,471,297 to Tani which is herein incorporated by reference. The method consists of: disposing a background screen composed of triangular-wave-like unit patterns each extending continuously in a predetermined direction, which are arranged at distances of equal pitch in rear of a measured material having light transmission properties; disposing an image pick-device capable of line-scanning in front of the measured material; taking a picture of the background screen through the measured material by successfully line-scanning the measured material with the image pick-up device; and measuring the optical distortion of the measured material on the basis of changes in angles between reference vectors and sample vectors in the triangular wave-like unit pattern. Although this method works in detecting optical distortion it has some limitations and problems.

For example, the method requires a scanning camera to line scan the image before any processing or analysis and line scanning is time-consuming and costly. Additionally, the triangular wave-like unit pattern is not as sensitive to distortions in the regions of interest in the materials as a square-grid pattern.

SUMMARY OF THE INVENTION

A system and method for measuring a level of optical distortion in a transparent material in accordance with the present invention includes an image capturing device, a section with a pattern of substantially uniform features, and a processing system which operates on software programmed in a memory in the processing system. The method for measuring the level of optical distortion stored in the memory comprises the steps of: inputting image signals of an image of a pattern of substantially uniform features as captured through the transparent material to a processing system; generating one or more parameter signals from the measurements of one or more parameters in each of the features in the image using the image signals; generating image area signals for each of the features in the image in response to the parameter signals, the image area signals representative of the area in each of the features in the image; generating a result signal in response to the image area signals for each of the features in the image.

The method and system for measuring optical distortion in a transparent material provides a number of advantages. For example, the method and system provide a nondestructive testing and evaluation technique for transparent materials. Additionally, the method and system can be used on a wide range of sizes for transparent materials. We have successfully quantified optical distortion in 12×12 inch glass plates, LCD glass substrates for television technology, petri dishes and beakers used for medical applications and a few polymer materials as well. Further, the method and the system are very easy to use because (i) the software is extremely user friendly; (ii) training for routine analysis takes only 2–4 hours per person, and (iii) the analytical algorithm has some degree of self-learning logic to accommodate analysis of a wide range of materials. Further, the method and system are able to analyze materials more quickly because a stationary camera rather than a line scanning device is used.

BRIEF DESCRIPTION OF THE DRAWINGS

FIG. 1B is a side view of the image capture device with respect to the transparent material and square grid pattern shown in FIG. 1A;

FIG. 6 is a table of coefficients used in the method;

FIGS. 7A and 7B are tables illustrating the range of predicted areas for the square grids in each of the twenty-two images;

FIGS. 9A–9C are tables which can be used to evaluate the totals shown in FIGS. 8A and 8B.

DETAILED DESCRIPTION OF THE INVENTION

Figure 1A:
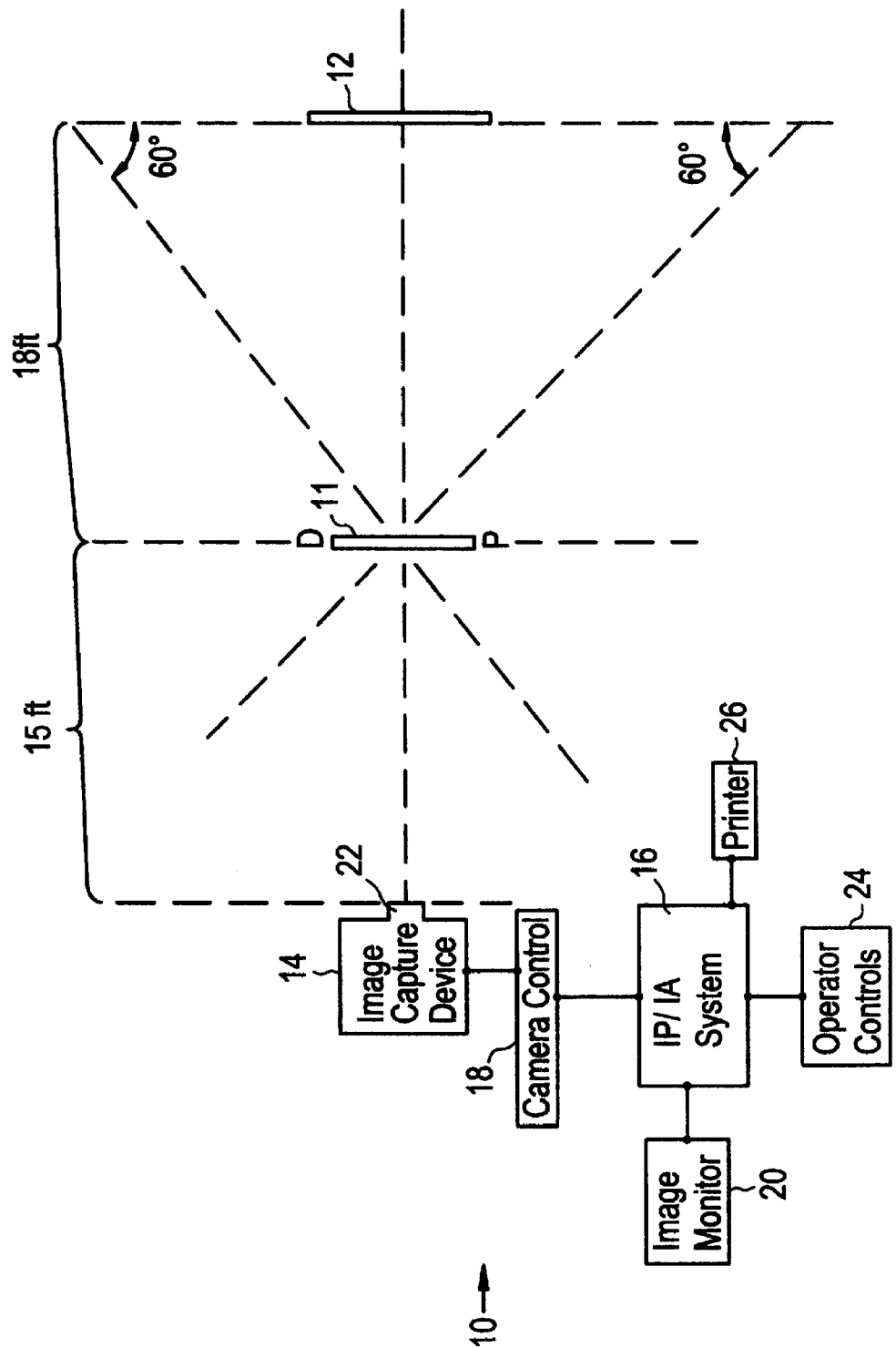
FIG. 1A is a top view of a system for measuring optical distortion in accordance with the present invention.
Figure 2:
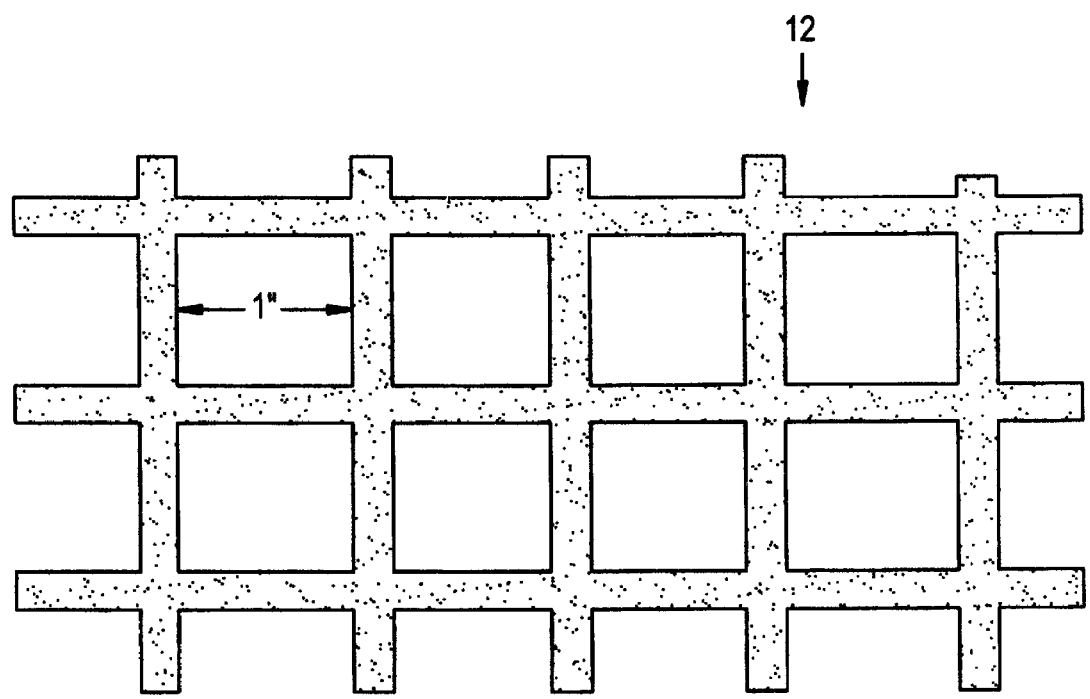
FIG. 2 is a diagram illustrating the square grid pattern.
Figure 3:
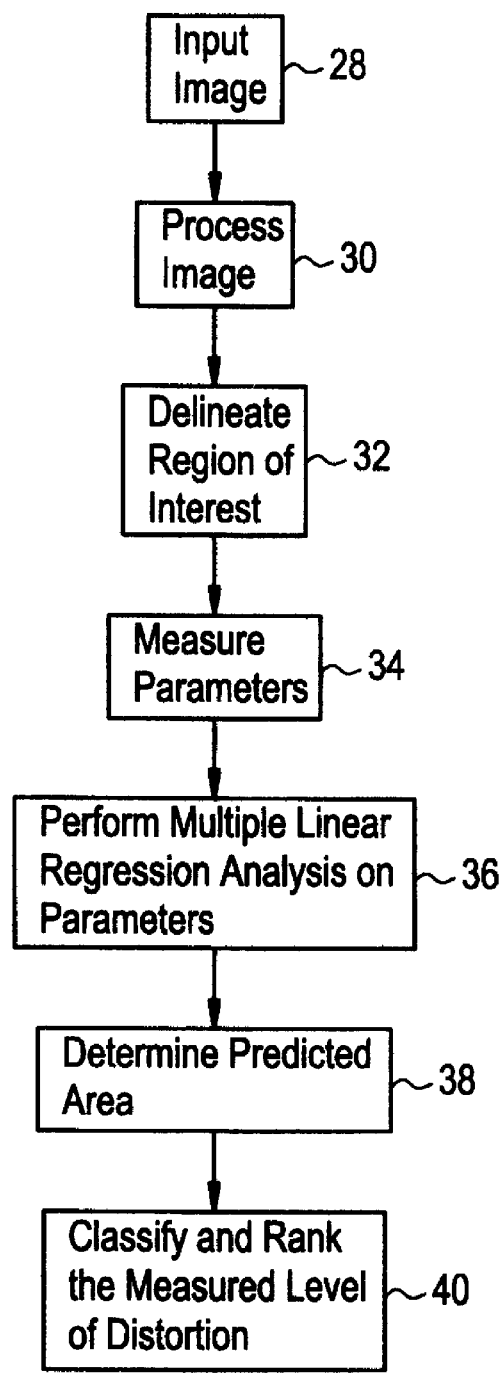
FIG. 3 is a flow chart illustrating the operation of the system and method for measuring optical distortion as stored in the memory of the IA/IP system.

A method and system 10 for measuring or quantifying optical distortion in a transparent or translucent material 11 or medium is illustrated in FIGS. 1–3. The system 10 and method include a section 12 with a square grid pattern, an image capture device 14, and an image analysis and image processing ("IA/IP") system 16. With the method and system, optical distortions in transparent material can be easily measured. The method and system 10 provide a number of advantages including being able to analyze transparent materials without destroying the samples and being able to analyze a wide range of sample sizes.

Referring more specifically to FIGS. 1A–1B, a transparent material 11 is positioned about 18 feet from the square grid pattern 12 and about 15 feet from the image capture device 14, although the particular distances can vary as needed. In this particular embodiment, the material 11 being examined is a 60"×35" NS windshield manufactured by Chrysler, although any type and/or size of transparent material 11 can be examined for optical distortions using this system 10 and method. In this particular embodiment, the size of the transparent material 11 can range from as small as three inches in diameter to as large as 60"×40".

Figure 5A:
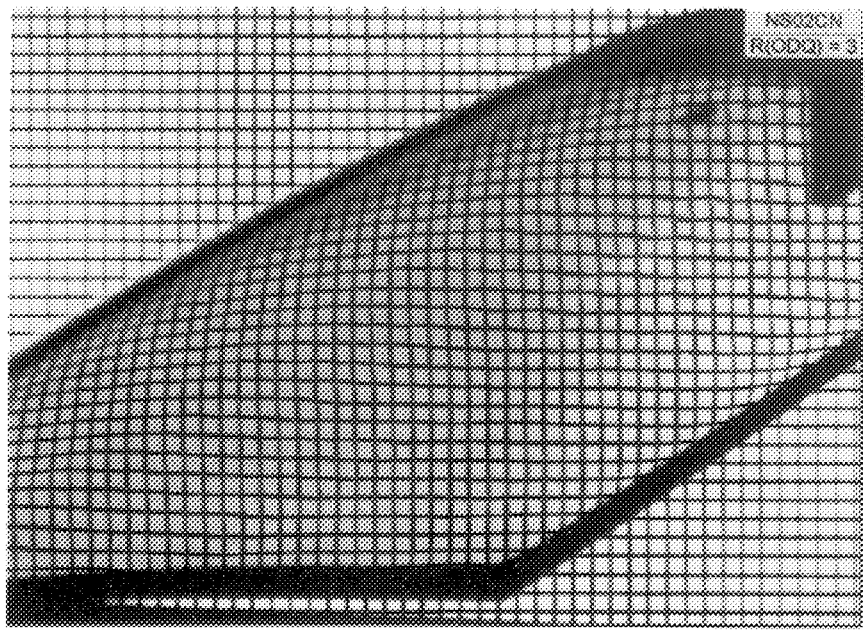
FIGS. 5A–5V are diagrams illustrating twenty-two images of the square grid pattern through eleven windshields.
Figure 5B:
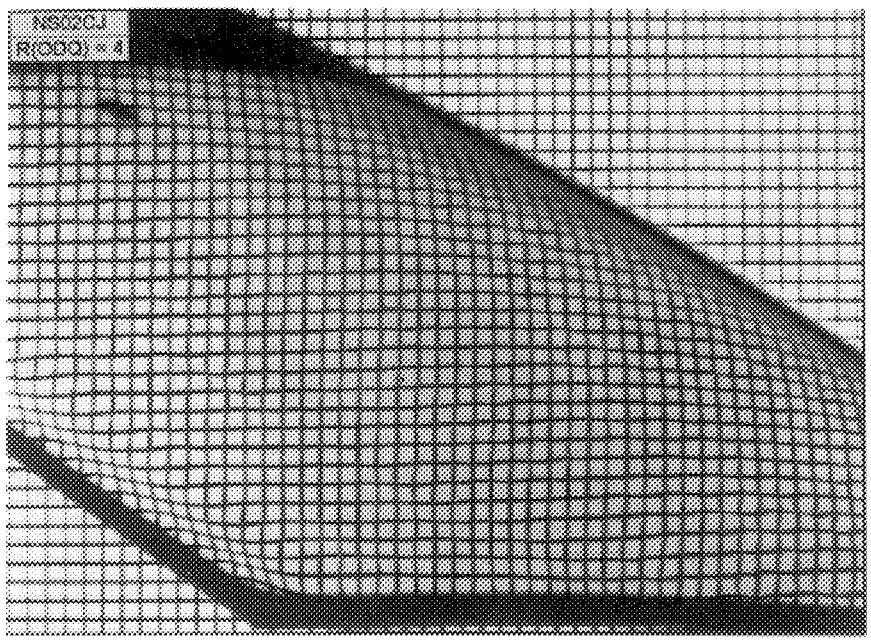
Figure 5C:
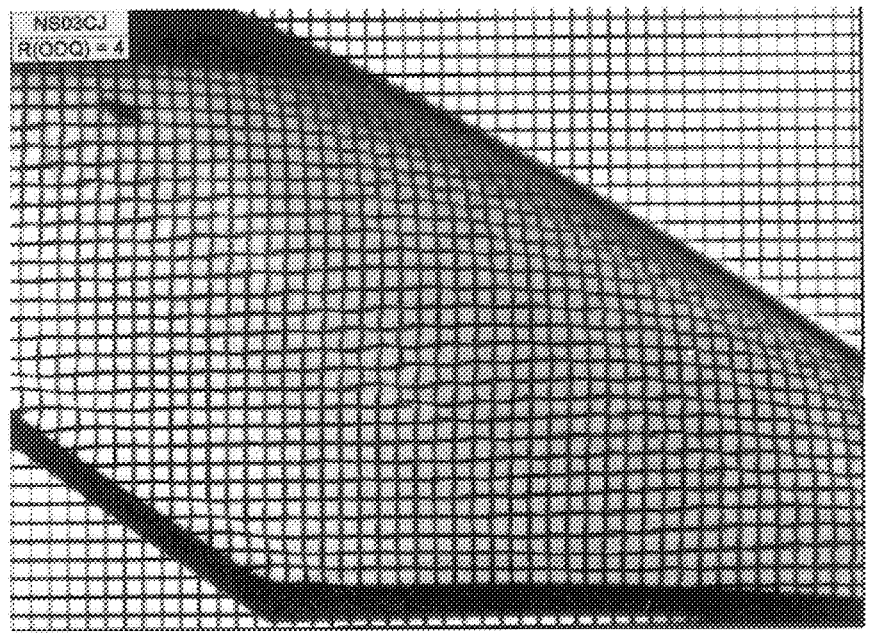
Figure 5D:
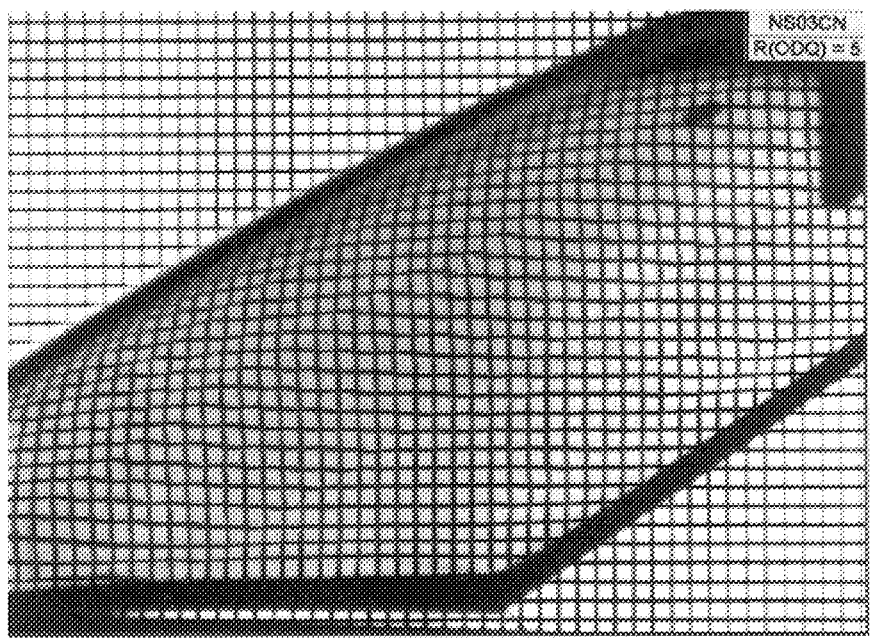
Figure 5E:
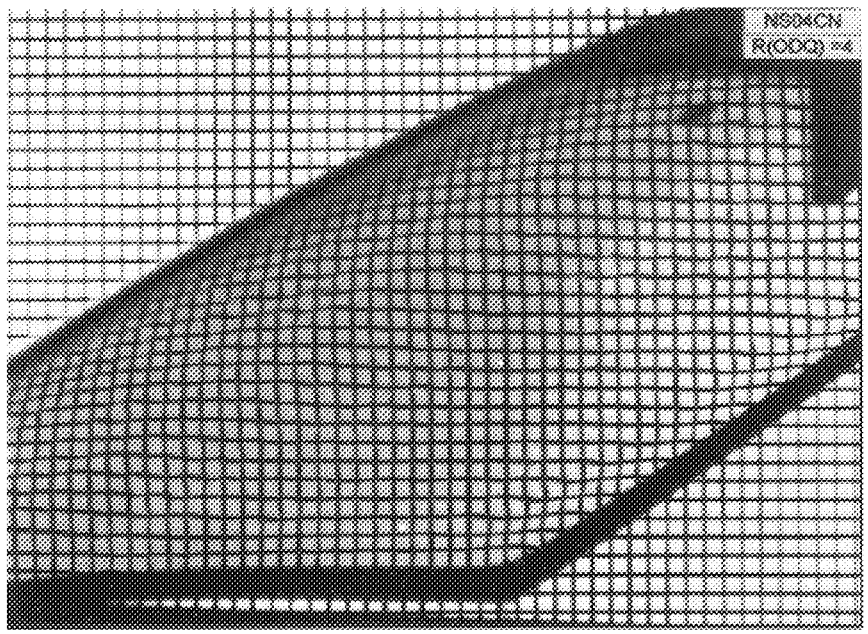
Figure 5F:
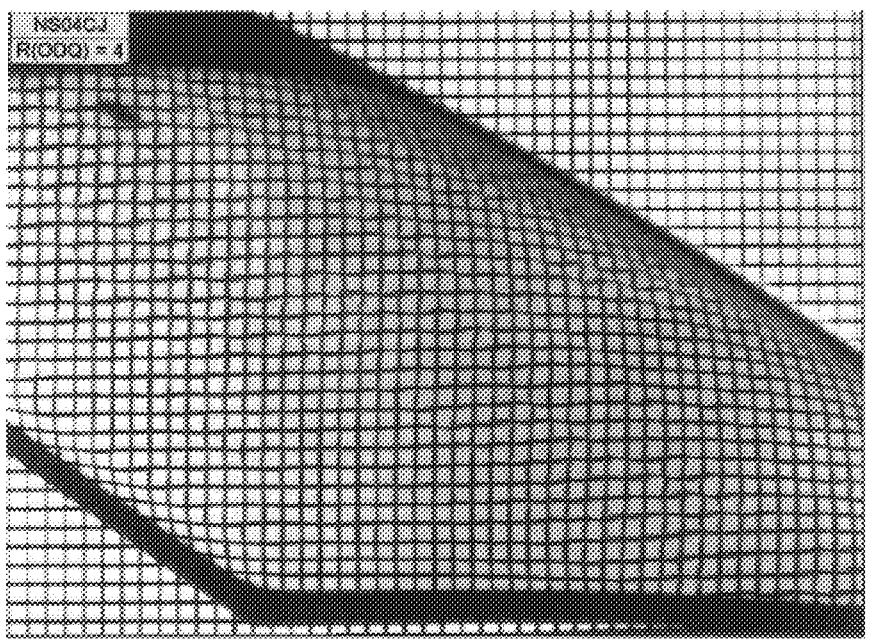
Figure 5G:
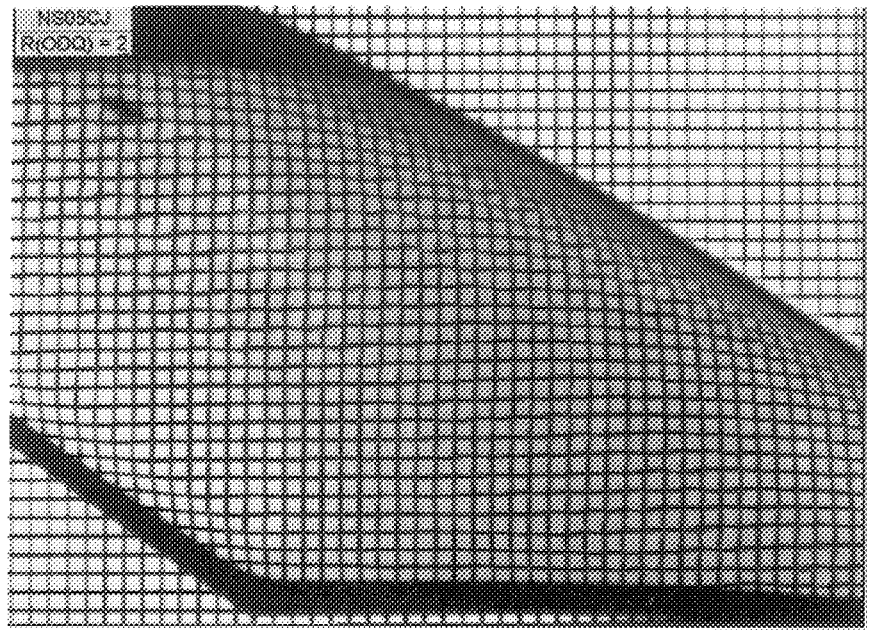
Figure 5H:
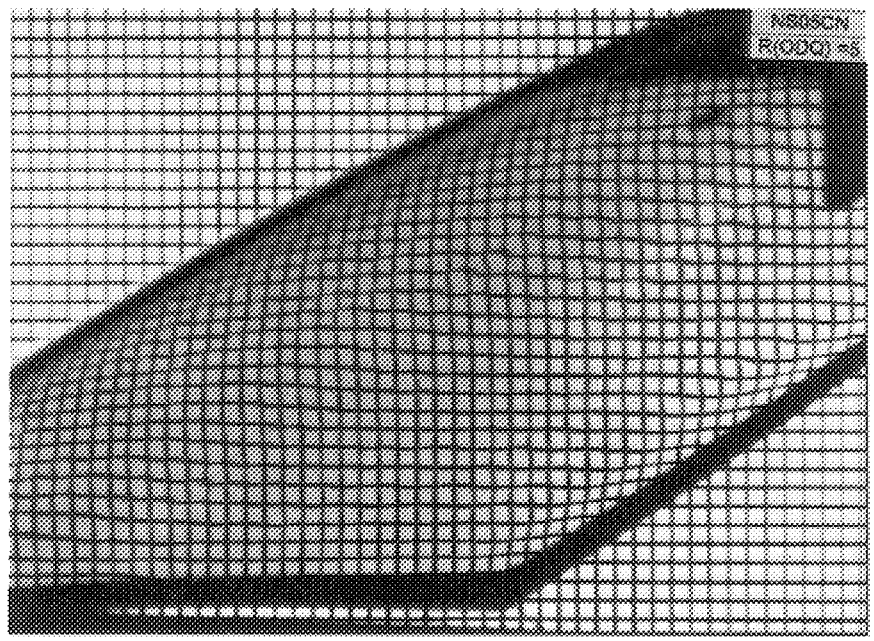
Figure 5I:
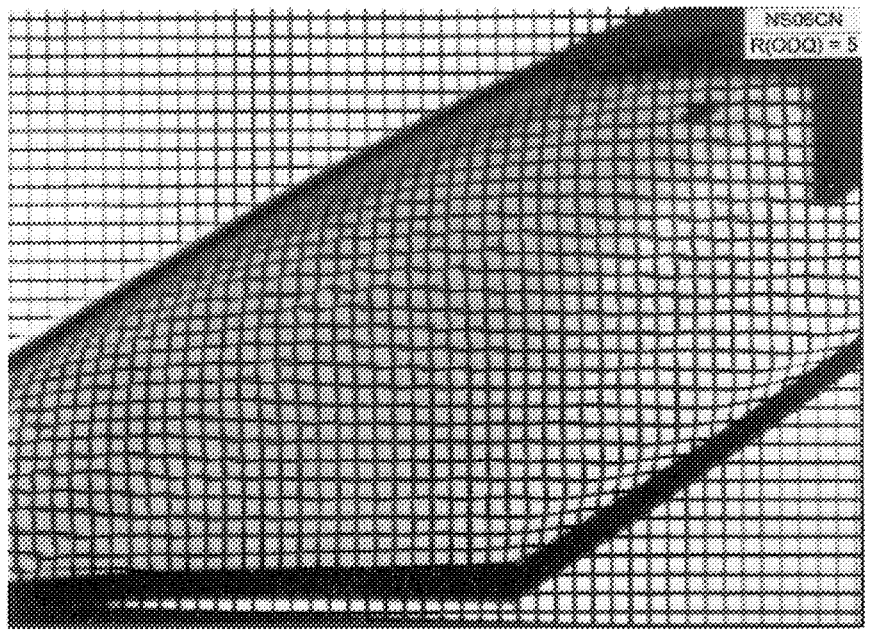
Figure 5J:
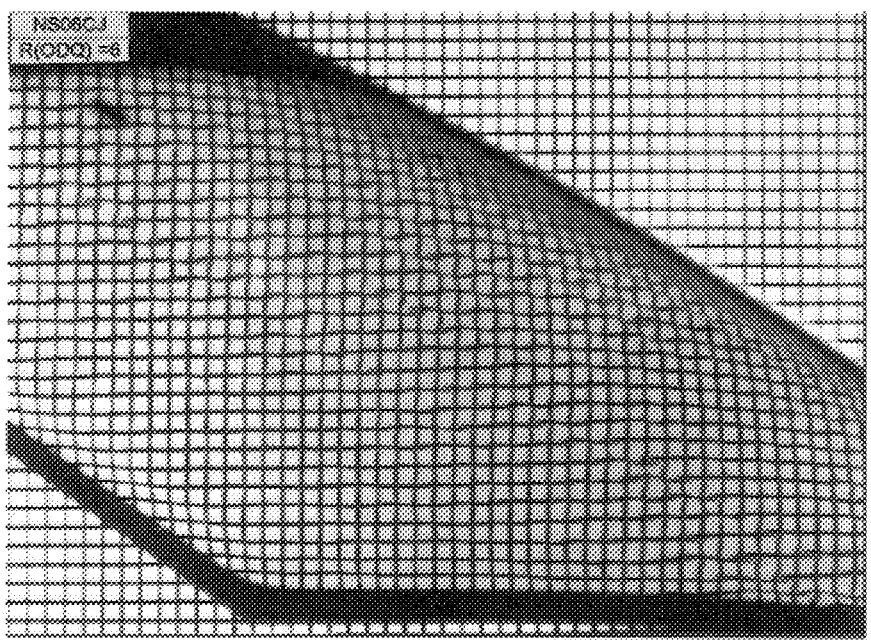
Figure 5K:
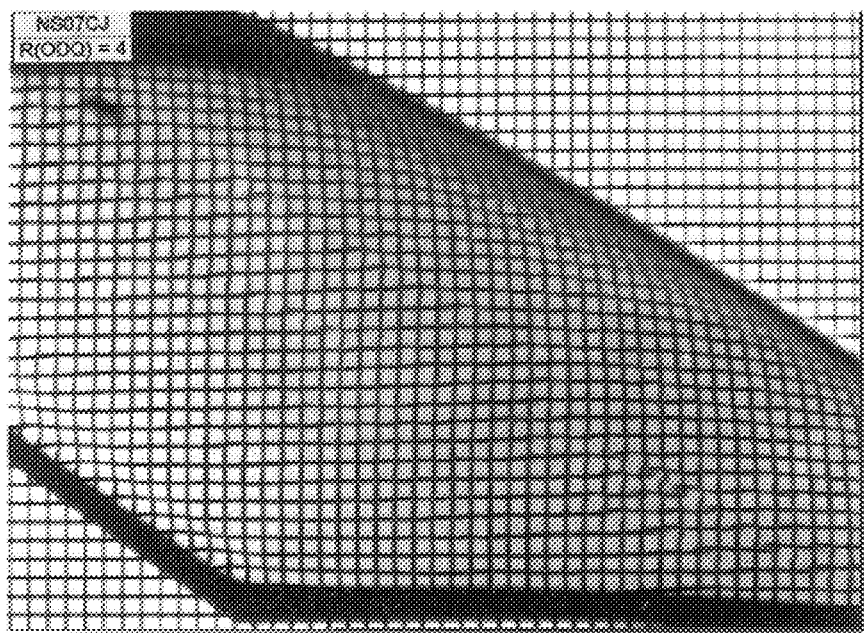
Figure 5L:
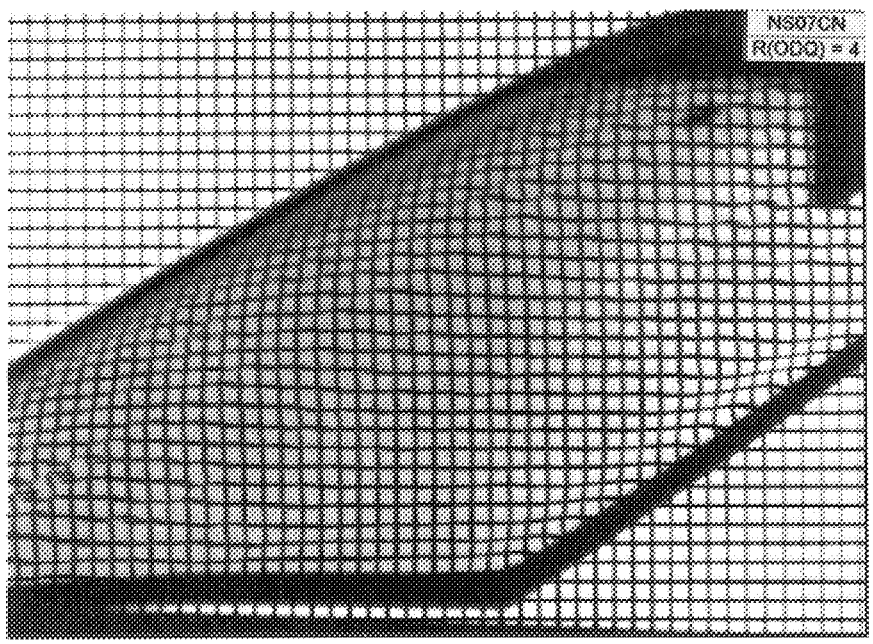
Figure 5M:
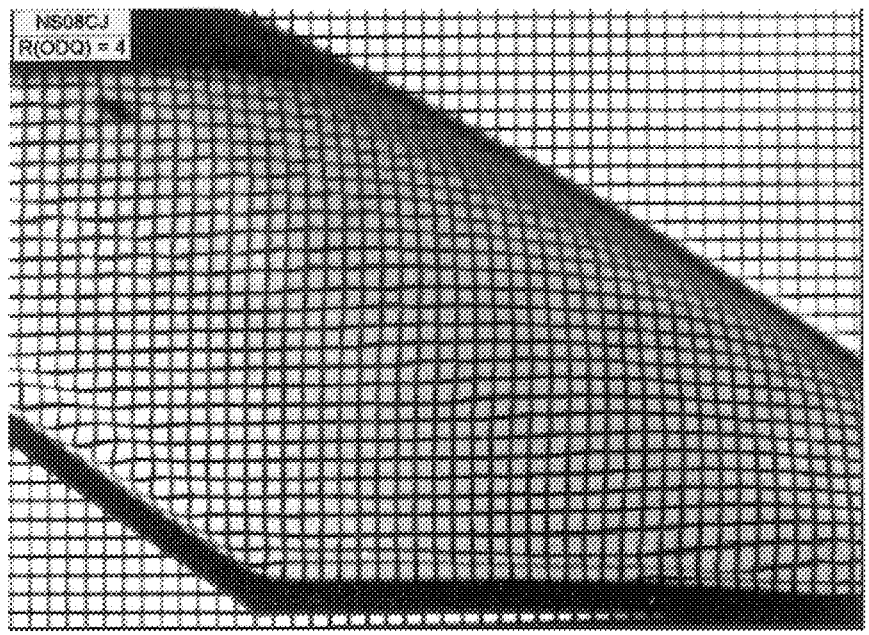
Figure 5N:
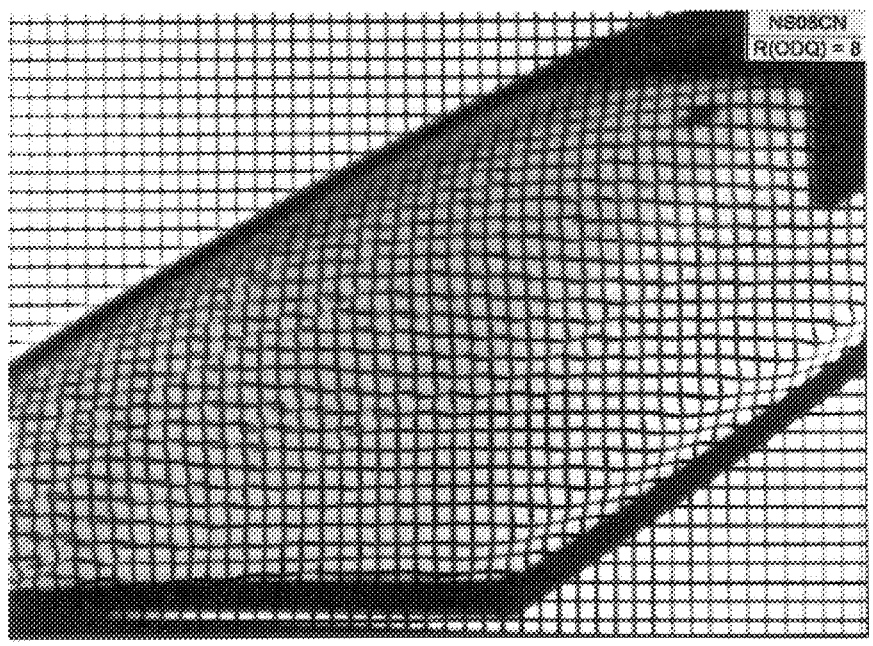
Figure 5O:
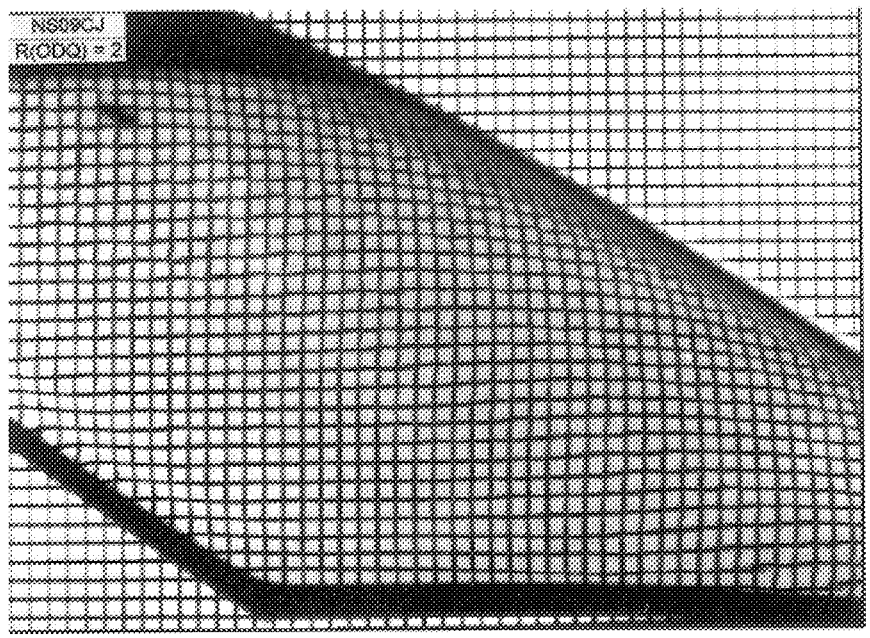
Figure 5P:
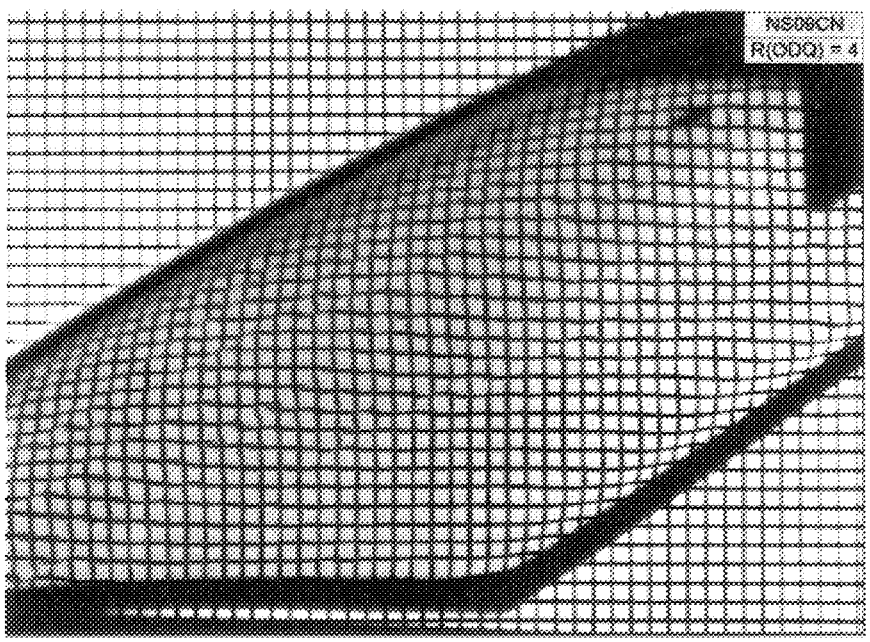
Figure 5Q:
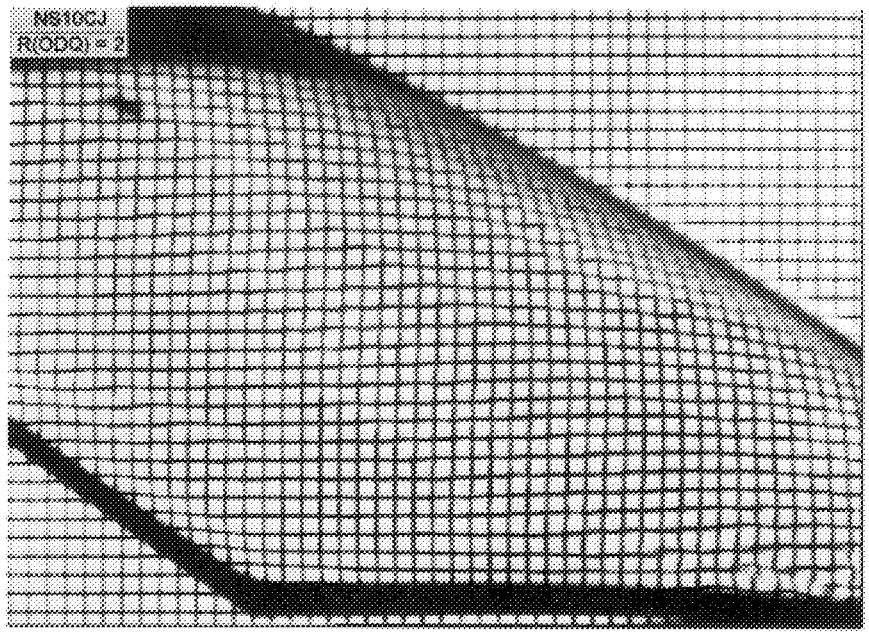
Figure 5R:
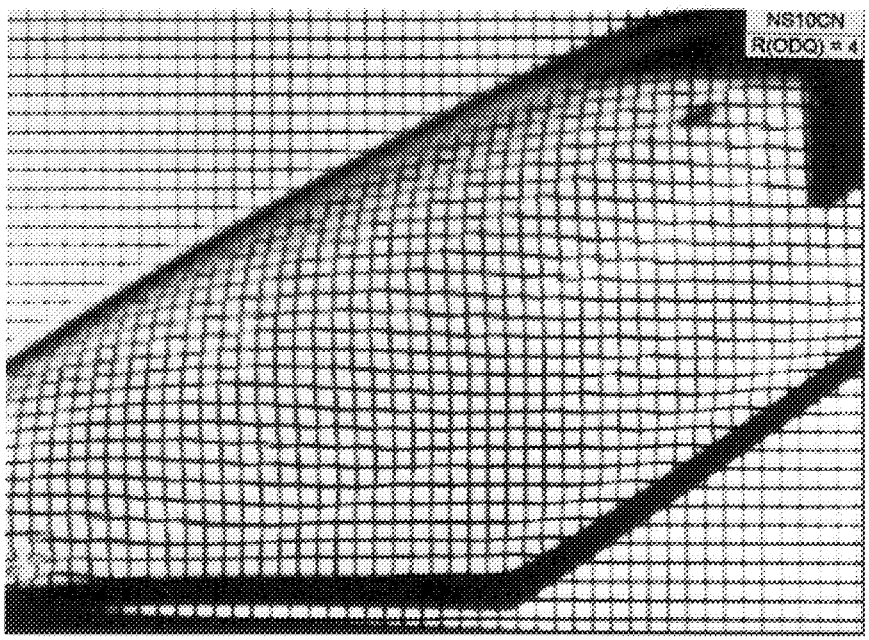
Figure 5S:
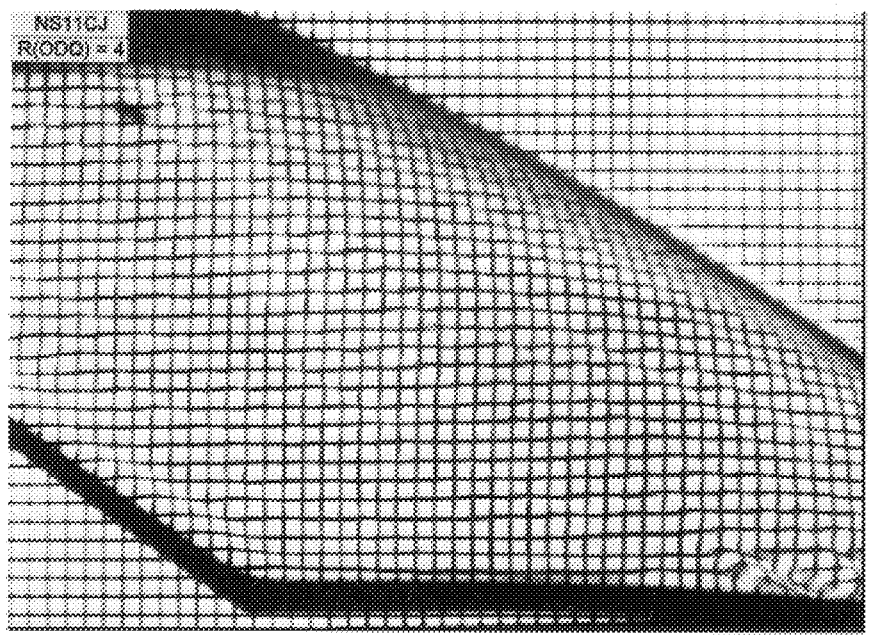
Figure 5T:
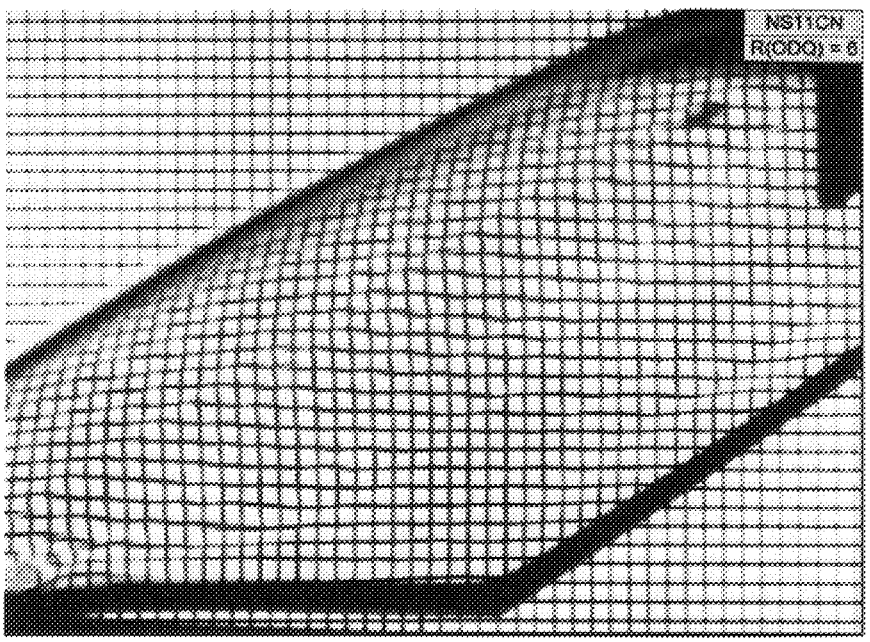
Figure 5U:
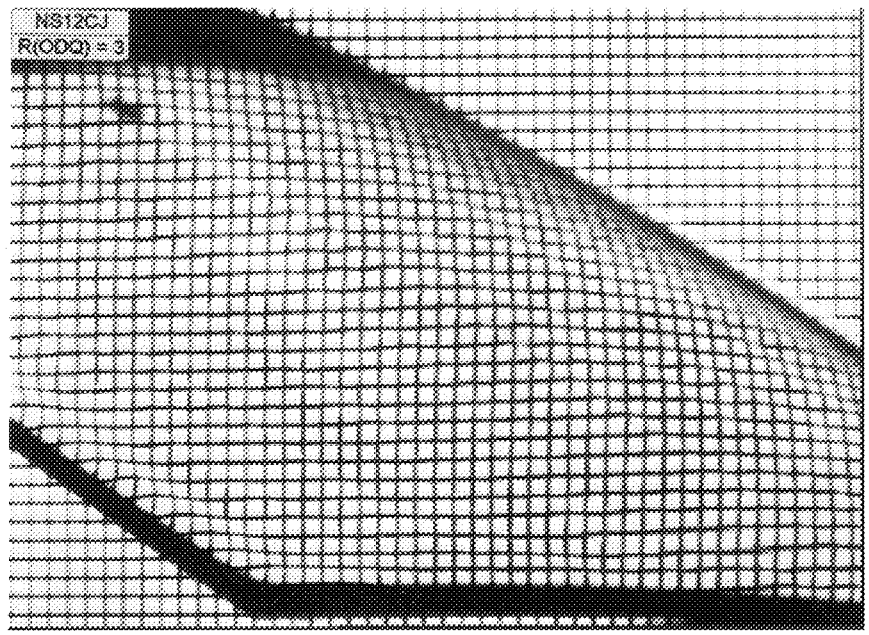
Figure 5V:
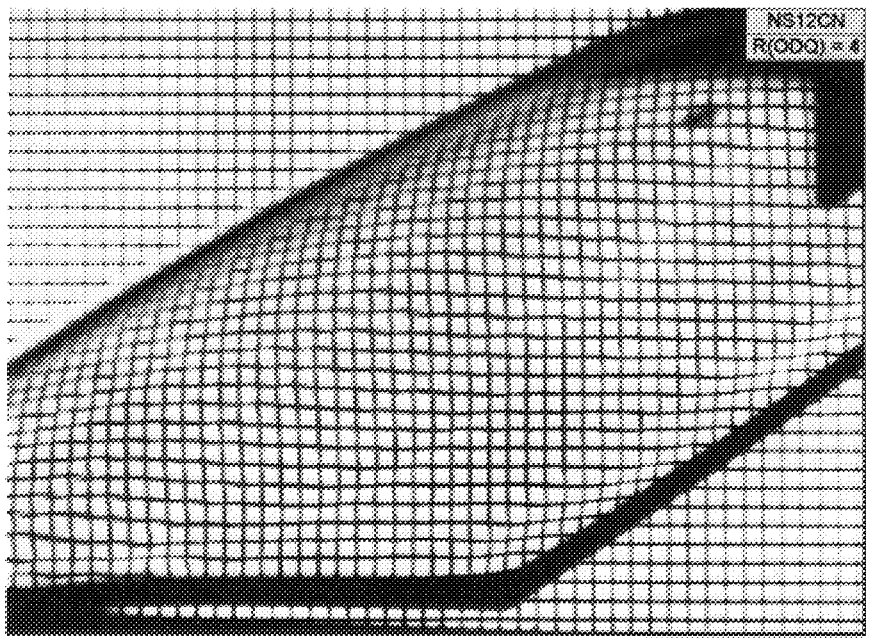

In this particular embodiment, the transparent material 11 is a windshield with a passenger side P and a driver side D that are used to help designate the particular angle of view. As shown in FIG. 1A, the material 11 can be substantially parallel with the section 12 with the square grid patten or can be tilted at an angle with respect to the plane of the section 12 with the square grid patten, such as at a 45° or 60° angle. When the passenger's side P is tilted to be closer to the image capture device 14 than the driver's side D, the tilt is referred to as a J-tilt and when the driver's side D is tilted to be closer to the image capture device 14 than the passenger's side P, the tilt is referred to as an N-tilt. The windshield 11 is placed on a carrier (not shown) which enables the transparent material 11 to be rotated to different angles. By way of example, twenty-two views of eleven windshields 11 (one J-tilt view and one N-tilt view of each windshield) were taken as shown in FIGS. 5A–5V to illustrate the operation of the system 10 and method. In these examples, the J-tilt views were taken at an angle of 60° and the N-tilt views were taken at an angle of 60°. Although a 60° angle was chosen for these examples, other angles could be used.

As shown in FIG. 1B, the transparent material 11 is tilted to an angle of about 30° with respect to the ground G, although the angle can vary as needed or desired. The transparent material 11 is tilted with respect to ground G because that is the mounting angle in most automobiles. In the examination of the twenty-two views of the eleven windshields 11 shown in FIGS. 5A–5V, the windshields were tilted to an angle of about 27° with respect to the ground G.

The image capture device 14 is coupled to a camera controller 18. The image capture device 14 is positioned to capture the image of the square grid pattern through the material 11. By way of example, twenty-two views of the square grid pattern through the eleven different windshields 11 (a J-tilt view and an N-tilt view for each of the eleven windshields) are illustrated in FIGS. 5A–5V. In the views illustrated in FIGS. 5A–5V, the J-tilt views are illustrated with an alphanumeric code with a J at the end of the code and the N-tilt views are illustrated with an alphanumeric code with an N at the end of the code. In this particular embodiment, a closed-circuit television camera is used, such as the SONY Model XC75 camera fitted with a NIKKOR 60 mm and 2.8 speed lens or an NEC RS-180 fitted with the NIKKOR 60 mm and 2.8 speed lens, although other types of image capture devices 14 could be used. The camera controller 18 transmits signals to the image capture 14 which control when and how the image capture device 14 captures each image. The image capture device 14 captures the image and transmits the image signals to the camera controller 18. In this particular embodiment, the image signals are analog video signals. The camera controller 18 is coupled to the IA/IP system 16 which is also coupled to an image monitor 20. The captured image can transmitted to the image monitor 20 to be displayed. The image monitor 20 is helpful in setting up the desired image and also for focusing the camera lens 22.

The IA/IP system 16 is coupled to the camera controller 18 and receives the image signals from the image capture device 14 via the camera controller 18. Although in this particular embodiment, the IA/IP system 16 receives the image signals from the image capture device 14, image signals could already be stored in a memory (not shown) and could be transmitted to the IA/IP system 16 in response to a request signal from the IA/IP system 16. The IA/IP system 16 includes a central processing unit (not shown) and a memory (not shown) which has a program stored in a manner well known in the art which causes the operation of the method for measuring optical distortion in a transparent material. The steps of the stored method are described with reference to the flow chart in FIG. 3 which is discussed in greater detail later. In this particular embodiment, the IA/IP system 16 is a LEICA Q500 MC system manufactured by Microsoft, although other types of systems could be used, such as a personal computer with the program discussed above stored in memory. The IA/IP system 16 is coupled to an operator controf 24, such as a keyboard (not shown) or mouse (not shown), which enables an operator to interact with the IA/IP system, i.e to input command signals. The IA/IP system 16 is also coupled to a printer 26.

Referring to FIG. 2, a portion of the square grid pattern on the section 12 is illustrated. In this particular embodiment, the square grid pattern has about 1000 one inch square grids or features which are separated by ¼ black lines. In this particular embodiment, about 600–800 features are in the windshield area for the captured image. Although a square grid pattern is shown, any type of uniform pattern which defines uniform areas could be used. Additionally, the section 12 can be any type of screen or wall on which the square grid pattern is located.

Referring to FIG. 3, a flow chart of the process for measuring optical distortion in a transparent material programmed in the memory of the IA/IP system 16 is illustrated. First in step 28, image signals to be analyzed are input. The image signals are input from the image capture device 14 which has captured an image of the square grid pattern through the windshield 11. In this particular embodiment, the IA/IP system 16 receives the analog image signals and digitizes the image signals. Although not shown, the image signals may also be stored and input from a memory device in response to a request signal from the IA/IP system 16.

Next, in step 30, the image signals are processed in the IA/IP system 16. The image signals being processed comprises the image of the white square grids (SG), or the features separated by black thin lines as captured through the windshield 11. The following sections, the words in capital letters and in parenthesis, are technical IA/IP terms of the operation described preceding the technical term. The black lines of the SG pattern are enhanced by a high-pass filtering operation (BLACK-TOP-HAT), while the white squared grids are well delineated. The SG pattern has an infinite number of gray levels, while the CCD camera can only detect 256 levels. The quantization of gray levels to 256 levels and isolation of white square gris (gray level greater than 100) is performed (THRESHOLD). Any noise in the image, or spurious unwanted specks in the image are then removed by shrinkage (EROSION) followed by an equal amount of reconstruction (DILATION).

Next, in step 32, a region of interest (ROI) mask, represented by ROI signals, is logically added (.AND.operation) with the image, represented by image processing signals, in the IA/IP system 16. The ROI signals can be retrieved from a memory (not shown) which has one or more stored sets of ROI signals for different masks or the ROI signals could be input via the operator control 24 by the operator, if desired. In this particular embodiment, the memory (not shown) has two sets of ROI signals, one for the J-tilt view of the windshield and one for the N-tilt view of the windshield. When the ROI signals are logically ANDed with the processed image signals, if any of the white square grids or features are cut off by the edges of the mask formed by the ROI signals, the white square grids or features along the cut off edges are "regrown" to their actual shape and size and are stored in the masked image signals. In this particular embodiment, the mask defines an area of about 700 white square grids or features, although the number can vary as needed or desired.

Figure 4A:
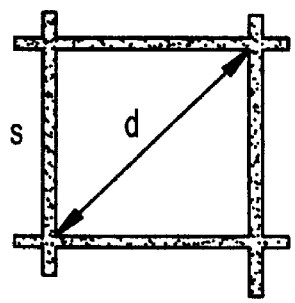
FIG. 4A is a diagram illustrating an undistorted square grid.
Figure 4B:
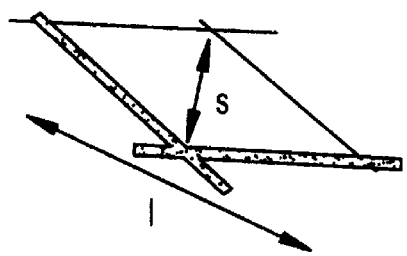
FIG. 4B is a view of a distorted square grid.
Figure 4C:
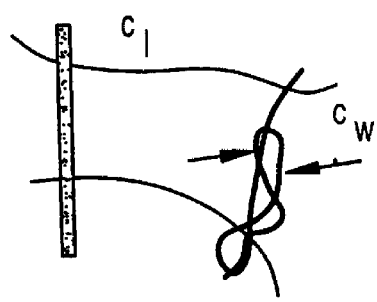
FIG. 4C is another view of a distorted square grid.

Next, in step 34, six different parameters of each white square grid or feature, represented by the masked image signals, are measured by the IA/IP system 16. The method in accordance with the present invention uses the area parameter A which is a powerful statistic that clearly distinguishes the undistorted images from the distorted images. Accordingly, the IP/IA system 16 measures the area parameter for each of the white square grids or features from the masked image signals and generates an area signal for each white square grid or feature. Additionally, the IP/IA system 16 measures the Perimeter P, Convex Perimeter $P_C$, V/H Percent $U_2$, Curve Width $W_C$, and Convex Area $A_C$ from the masked image signals and generates a perimeter signal, a convex perimeter signal a V/H percent signal, a curve width signal, and a convex area signal for each white square grid or feature. These other five parameters were selected because they exhibit significant correlation with the area parameter A as explained in greater detail in U.S. provisional application Ser. No. 60/005,478 filed on Oct. 16, 1995, which is herein incorporated by reference. More specifically, the Perimeter P is measured from the edge pixels of each white square feature. Convex Perimeter Pc is obtained using the equation:

$$P_C = 2\tan(\tau/16) * \Sigma \text{all of the 32 Ferets}$$

where a Feret is the diameter along a given direction. V/H Percent $U_2$ is a user-defined parameter and can be obtained using the equation:

$$U_2 = (V_P/H_P) * 100$$

where $V_P$ is the vertical projection or Feret and $H_P$ is the horizontal projection or Feret. Curve Width $W_C$ is the horizontally disposed meander length, is also shown in FIG. 4C, and can be obtained using the equation:

$$W_C = (P - (P^2 - 16A)^{1/2})/4$$

Convex Area $A_C$ can be obtained from the geometric mean of the 32 Ferets. Although six parameters are used in this particular embodiment, the number of parameters and type of parameter selected can vary as long as each parameter has a significant correlation to the area as explained above.

Next, in step 36, a multiple linear regression analysis is performed by the IA/IP system 16 on the perimeter signals, convex perimeter signals, V/H percent signals, curve width signals, and convex area signals to statistically determine the area A, represented by an area signal, for each of the white square grids or features. For purposes of this method and system, it is assumed that the parameters are related by the equation:

$$A = b_0 + b_1 P + b_2 P_C + b_3 U_2 + b_4 W_C + b_5 A_C$$

By performing a multiple linear regression analysis on the parameters, a set of coefficients $a_i$ that are statistically close to the coefficients $b_i$ can be obtained and the above-noted equation becomes:

$$A' = a_0 + a_1 P + a_2 P_C + a_3 U_2 + a_4 W_C + a_5 A_C$$

In this particular embodiment, the equation was analyzed twenty-two times (for the J-tilt and N-tilt views of each of the eleven windshields in this example). The resulting $a_i$ coefficients for the views of the windshields set forth in FIGS. 5A–5V are set forth in the table in FIG. 6.

Next, in step 38, the predicted areas A' for each of the white square grids or features are generated by the IA/IP system 16 using the $a_i$ coefficients from the table in FIG. 6 and the perimeter signals, convex perimeter signals, V/H percent signals, curve width signals, and convex area signals measured earlier and predicted area A' signals are generated which represent the area in each feature. The predicted areas are measured for each of the white square grids or features for each of the twenty-two views of the eleven windshields and are set forth in the tables in FIGS. 7A and 7B. The tables are divided into five regions, with each region having seven different areas, although the number of regions and areas can vary as needed and desired.

More specifically, in this particular embodiment a central region 42 has predicted areas A' ranging from 100 $p^2$ to 130 $p^2$, adjacent regions 44 and 46 have predicted areas A' ranging from 65 $p^2$ to 95 $p^2$ and 135 $p^2$ to 165 $p^2$, and outside regions 48 and 50 have predicted areas A' ranging from 30 $p^2$ to 60 $p^2$ and 170 $p^2$ to 200 $p^2$. The predicted areas A' in the adjacent regions 44 and 46 are about 1$\sigma$ a (standard deviation) to 2.5$\sigma$ from the central region 42 and the predicted areas A' in the outside regions 48 and 50 are about 2.75$\sigma$ to 4.25$\sigma$ from the central region 42. In this particular example, to generate the table the measured areas for each white square feature are rounded to the nearest fifth, e.g. a measured predicted area of 134 $p^2$ would be rounded to 135 $p^2$ while a measured predicted area of 133 $p^2$ would be rounded to 135 $p^2$, and then the predicted areas A' are added to the totals in the tables. The numbers in each column in the table in FIGS. 7A and 7B represent the number of white square features in a particular view (J-tilt or N-tilt) of a windshield shown in FIGS. 5A–5V with the area listed in the leftmost column of the table. The particular areas, standard deviations between regions, etc. can and will vary based on factors, such as the type of material being examined.

Figure 8A:
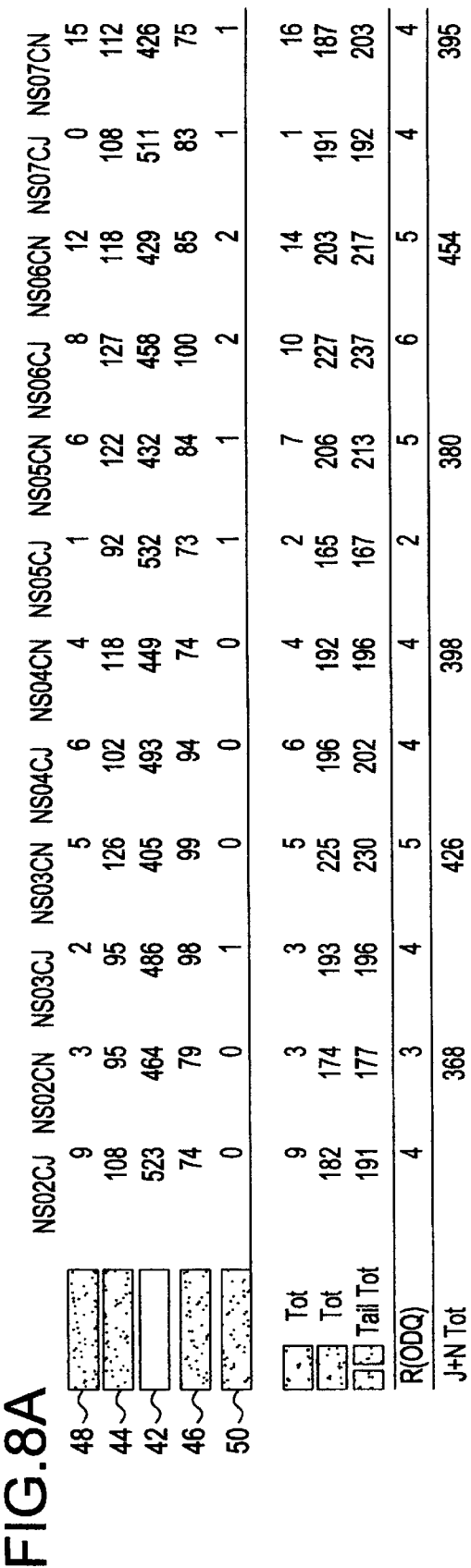
FIGS. 8A and 8B are tables illustrating the total number of square grids in the central, adjacent, and outside regions shown in the tables in FIGS. 7A and 7B.
Figure 8B:
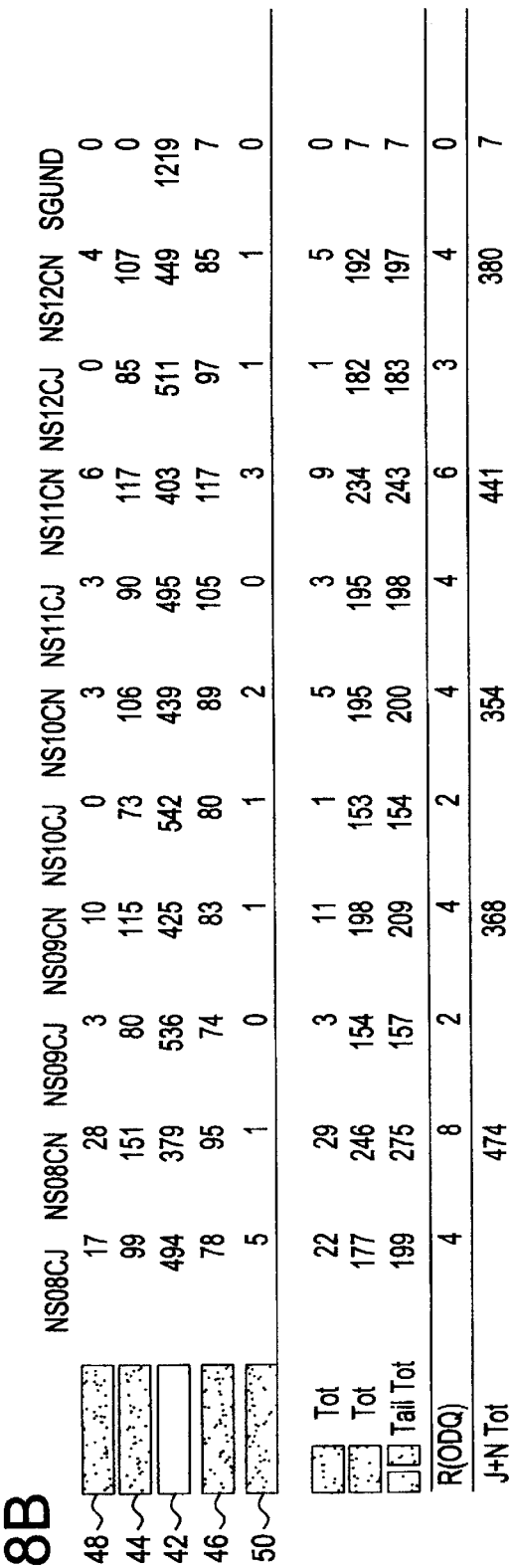

Next, in step 40, the level of optical distortion in each windshield 11 is classified and ranked by the IA/IP system 16 and a level signal along with a status signal are generated and sent by the IA/IP system 16 to the image monitor 20. First, as shown in table in FIGS. 8A and 8B, the number of white square features in the central region, adjacent regions, and the outside regions is determined by the IP/IA system 16. Next, the total or tail total ("TT") of white square grids or features outside the central region is totalled and a total signal is generated for each view of each windshield.

Next, these totals TTs are ranked by the IP/IA system 16. By way of example, three different tables are illustrated in FIGS. 9A–9C which can be used to rank and classify the transparent materials 11, although other ranking techniques could be used. Each of the tables in FIG. 9A–9C are programmed into the memory (not shown) in the IA/IP system 16.

Referring to FIG. 9A, first the total TT of a particular view (J-tilt or N-tilt) is used to obtain a rank of optical distortion, referred to as R(ODQ), by comparing the total TT against the table in FIG. 9A and assigning an R(ODQ) value based on the comparison. The IA/IP system 16 generates an R(ODQ) signal based on the comparison of the total signal TT against the table in FIG. 9A. Once the R(ODQ) signal, representative of the measured or ranked optical distortion, is obtained, then the IP/IA system 16 compares the R(ODQ) against a preselected acceptable level, represented by a level signal, and a result signal related to whether or not the windshield 11 is acceptable is generated and assigned to the view. The result signal may be output to the operator by display on the image monitor 20, on a printer 26, or is stored in a memory (not shown).

By way of example, if the IP/IA system 16 has determined that the total TT is 191, then the 191 would first be compared against the table in FIG. 9A and would be assigned an R(ODQ)=4. Next, the R(ODQ)=4 would be compared against the preselected acceptable level of <=4, in this particular embodiment, and would be assigned an output signal which indicates that the view was acceptable.

Since two views (a J-tilt view and an N-tilt view), are taken of each windshield 11, an additional process step may need to be conducted to determine if both views for each windshield are acceptable. For example, the R(ODQ) of windshield NS04CJ is 4 in FIG. 5F (the J-tilt view) and the R(ODQ) of windshield NS04CN is also 4 in FIG. 5E (the N-tilt view). Thus, in this example the windshield would be acceptable because both windshields have an R(ODQ)<=4 and a result signal which indicated that the windshield was acceptable would be generated by the IA/IP system 16. However, by way of example, the R(ODQ) of NS08CJ is 4 in FIG. 5M (the J-tilt view), but the R(ODQ) of NS08CN is 8 in FIG. 5N (the J-tilt view). Thus, this windshield would be rejected and a result signal which indicated that the windshield was rejected would be generated by the IA/(IP system 16. It would be readily apparent to one skilled in the art that numerous variations of analyzing the results of both views of the windshield could be implemented, such as tolerating a higher R(ODQ) value for the passenger's side of the windshield (the J-tilt view) than for the driver's side (the N-tilt view).

Alternatively, Referring to FIG. 9B the IA/IP system 16 might compare the total TT, represented by the total signal, against the table in FIG. 9B to determine if the view of the windshield 11 is acceptable and generates the output signal based on the comparison without assigning an R(ODQ) value to the material 11. By way of example, a total TT of 191 would be compared against the table in FIG. 9B and would be determined to be acceptable. Since the windshield was acceptable, the IA/IP system 16 would generate a result signal that indicated that the windshield was acceptable. Again, the result signal may be output to the operator by display on the image monitor 20, on a printer 26, or is stored in a memory (not shown).

Referring to FIG. 9C, another way to determine if a windshield is acceptable is illustrated. In this alternative, the IA/IP system 16 uses both the J-tilt view and the N-tilt view to rank and classify the windshield. First, the total TT for the J-tilt view and the N-tile view for the windshield 11 are added together by the IA/IP system 16. For example, the 191 from the J-tilt view would be added to the 177 from the N-tilt view to get a J+N total of 368 for the windshield. The 368 total, which is represented by a total signal, is compared against the table in FIG. 9C and would indicate that the windshield was acceptable. Accordingly, the IA/IP system 16 would generate a result signal that indicated that the windshield was acceptable. Again, the result signal may be output to the operator by display on the image monitor 20, on a printer 26, or is stored in a memory (not shown).

The particular level of acceptable distortion used in the tables in FIGS. 9A–9C can vary and may depend on a number of factors, such as the type of material, e.g. windshield, window glass, lens, etc., the desired quality level, and the acceptable level of optical distortion. Each manufacturer can set its own standards as needed and desired.

Having thus described the basic concept of the invention, it will be readily apparent that those skilled in the art that the foregoing detailed disclosure is intended to be presented by way of example only, and is not limiting. Various alterations, improvements and modifications will occur and are intended to those skilled in the art, though not expressly stated herein. These modifications, alterations, and improvements are intended to be suggested hereby, and are within the spirit and scope of the invention. Accordingly, the invention is limited only by the following claims and equivalents thereto.

What is claimed is:

1. A method for measuring a level of optical distortion in a transparent material, the method comprising the steps of:

inputting image signals of an image of a pattern of features as captured through the transparent material to a processing system;

generating one or more parameter signals from the measurements of one or more parameters in each of the features in the image using the image signals, generating image area signals for each of the features in the image in response to the parameter signals, the image area signals representative of the area in each of the features in the image; and generating a result signal in response to the image area signals for each of the features in the image.

2. The method according to claim 1 wherein the step of generating a result signal further comprises the steps of:

determining the number of image area signals which are outside a range of reference area signals;

generating a total signal from the number of image area signals outside the range;

assigning an optical distortion level signal in response to the total signal;

comparing the optical distortion level signal against a reference level signal; and generating the result signal in response to the comparison.

3. The method according to claim 1 wherein the step of generating an optical distortion level signal further comprises the steps of:

determining the number of image area signals which are outside a range of reference area signals;

generating a total signal from the number of image area signals outside the range;

comparing the total signal against a reference level signal; and generating the result signal in response to the comparison.

4. The method according to claim 1 wherein there are six measured parameters.

5. The method according to claim 4 wherein the six measured parameters are area, perimeter, convex perimeter, V/H percent, curve width, and convex area.

6. The method according to claim 1 further comprising the steps of filtering the image signals; and thresholding the image signals.

7. The method according to claim 1 wherein the pattern is a square grid pattern and the feature is a square grid.

8. The method according to claim 7 further comprising the steps of:

positioning the square grid pattern behind the transparent material; and generating the image signals by capturing the image of the square grid pattern through the transparent material all at one time.

9. The method according to claim 1 further comprising the step of masking a region of interest in the image.

10. A system for measuring a level of optical distortion in a transparent material, the system comprising:

a section with a pattern of features positioned behind the transparent material;

an image capture device for capturing an image of the pattern of features through the transparent material;

means for generating one or more parameter signals from the measurements of one or more parameters in each of the features in the image using the image signals;

means for generating image area signals for each of the features in the image in response to the parameter signals;

the image area signals representative of the area in each of the features in the image; and means for generating a result signal in response to the image area signals for each of the features in the image.

11. The system according to claim 10 wherein the means for generating a result signal further comprises:

means for determining the number of image area signals which are outside a range of reference area signals;

means for generating a total signal from the number of image area signals outside the range;

means for assigning an optical distortion level signal in response to the total signal;

means for comparing the optical distortion level signal against a reference level signal; and means for generating the result signal in response to the comparison.

12. The system according to claim 10 wherein the means for generating a result signal further comprises:

means for determining the number of image area signals which are outside a range of reference area signals;

means for generating a total signal from the number of image area signals outside the range;

means for comparing the total signal against a reference level signal; and means for generating the result signal in response to the comparison.

13. The system according to claim 10 wherein there are six measured parameters.

14. The system according to claim 13 wherein the six measured parameters are area, perimeter, convex perimeter, V/H percent, curve width, and convex area.

15. The system according to claim 10 further comprising;

means for filtering the image signals; and means for thresholding the image signals.

16. The system according to claim 10 wherein the pattern is a square grid pattern and the feature is a square grid.

17. The system according to claim 1 further comprising means for masking a region of interest in the image.

18. A method for quantifying a level of optical distortion in a transparent material, the method comprising the steps of:

positioning a section with a square grid pattern behind the transparent material;

generating image signals by capturing an image of the square grid pattern through the transparent material with an image capture device, generating one or more parameter signals from the measurements of one or more parameters in each of the features in the image using the image signals;

generating image area signals for each of the features in the image in response to the parameter signals, the image area signals representative of the area in each of the features in the image;

determining the number of image area signals which are outside a range of reference area signals;

generating a total signal from the number of image area signals outside the range;

assigning an optical distortion level signal in response to the total signal;

comparing the optical distortion level signal against a reference level signal; and generating a result signal in response to the comparison.

19. The method according to claim 18 wherein the six measured parameters are area, perimeter, convex perimeter, V/H percent, curve width, and convex area.

* * * * *